United States Patent
Ansems et al.

(10) Patent No.: US 7,506,998 B2
(45) Date of Patent: Mar. 24, 2009

(54) ILLUMINATION SYSTEM

(75) Inventors: Johannes Petrus Maria Ansems, Eindhoven (NL); Christoph Gerard August Hoelen, Eindhoven (NL); Ad Van Den Brandt, Eindhoven (NL); Jorrit Ernst De Vries, Eindhoven (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 0 days.

(21) Appl. No.: 11/575,519

(22) PCT Filed: Aug. 18, 2005

(86) PCT No.: PCT/IB2005/052720

§ 371 (c)(1),
(2), (4) Date: Mar. 19, 2007

(87) PCT Pub. No.: WO2006/033029

PCT Pub. Date: Mar. 30, 2006

(65) Prior Publication Data

US 2007/0263383 A1 Nov. 15, 2007

(30) Foreign Application Priority Data

Sep. 24, 2004 (EP) ................... 04104639

(51) Int. Cl.
*F21V 5/00* (2006.01)
(52) U.S. Cl. .................... 362/245
(58) Field of Classification Search ......... 362/611–613, 362/240, 244–246, 227, 231, 235–236, 551, 362/555, 560, 583, 326, 327, 329, 331
See application file for complete search history.

(56) References Cited

U.S. PATENT DOCUMENTS

| 5,709,463 | A | * | 1/1998 | Igram .................. 362/268 |
| 5,757,126 | A | * | 5/1998 | Harvey et al. ........... 313/506 |
| 6,272,269 | B1 | | 8/2001 | Naum |
| 6,527,411 | B1 | * | 3/2003 | Sayers .................. 362/245 |
| 6,637,924 | B2 | | 10/2003 | Pelka et al. |
| 2002/0080615 | A1 | | 6/2002 | Marshall et al. |
| 2004/0012976 | A1 | | 1/2004 | Amano |
| 2005/0185416 | A1 | * | 8/2005 | Lee et al. ............... 362/551 |
| 2005/0243570 | A1 | * | 11/2005 | Chaves et al. ........... 362/551 |
| 2006/0002101 | A1 | * | 1/2006 | Wheatley et al. .......... 362/84 |

FOREIGN PATENT DOCUMENTS

| JP | 2002133932 A1 | 5/2002 |
| JP | 2004014365 A | 1/2004 |
| WO | 2003071352 A1 | 8/2003 |

* cited by examiner

*Primary Examiner*—Jong-Suk (James) Lee
*Assistant Examiner*—Julie A Shallenberger

(57) ABSTRACT

An illumination system has a plurality (2) of light-collimating sections (12, 12', 12") and a light-mixing section (3). The light-collimating sections are arranged substantially parallel to each other along a longitudinal axis (25) of the illumination system. Each of the light-collimating sections is associated with at least one light emitter (R, G, B). Each of the light emitters is being in optical contact with the respective light-collimating section via a dielectric material with a refractive index larger than or equal to 1.3. At a side facing away from the light emitters, the light-collimating sections merge into the light-mixing, the light-collimating sections and the light-mixing section forming one integral part. Light propagation in the light-mixing section is based on total internal reflection and the light-mixing section has a plurality of faces parallel to the longitudinal axis. Preferably, the light-mixing section at a side facing away from the light emitters is provided with a further light-collimating section.

12 Claims, 3 Drawing Sheets

ILLUMINATION SYSTEM

The invention relates to an illumination system comprising a plurality of light-collimating sections and a light-mixing section.

Such illumination systems are known per se. They are used, inter alia, as backlighting of (image) display devices, for example for television receivers and monitors. Such illumination systems can particularly suitably be used as a backlight for non-emissive displays, such as liquid crystal display devices, also referred to as LCD panels, which are used in (portable) computers or (cordless) telephones. Another application area of the illumination system according to the invention is the use as illumination source in a digital projector or so-called beamer for projecting images or displaying a television program, a film, a video program or a DVD, or the like. In addition, such illumination systems are used for general lighting purposes, such as spot lights, accent lighting, flood lights and for large-area direct-view light emitting panels such as applied, for instance, in signage, contour lighting, and billboards. In other applications, the light emitted by such illumination systems is fed into a light guide, optical fiber or other beam-shaping optics.

Generally, such illumination systems comprise a multiplicity of light emitters, for instance light-emitting diodes (LEDs). LEDs can be light sources of distinct primary colors, such as, for example the well-known red (R), green (G), or blue (B) light emitters. In addition, the light emitter can have, for example, amber, magenta or cyan as primary color. These primary colors may be either generated directly by the light-emitting-diode chip, or may be generated by a phosphor upon irradiance with light from the light-emitting-diode chip. In the latter case, also mixed colors or white light is possible as one of the primary colors. Generally, the light emitted by the light emitters is mixed in the transparent element(s) to obtain a uniform distribution of the light while eliminating the correlation of the light emitted by the illumination system to a specific light emitter. In addition, it is known to employ a controller with a sensor and some feedback algorithm in order to obtain high color accuracy.

The English translation of Japanese patent application JP-A 2002-133 932 describes an illumination system comprising a light-guide member comprising three LEDs of different primary colors. In the known illumination system, the light is mixed such that the light emitted by the illumination system is substantially white. The light-guide member comprises three recessed portions for accommodating housing for the respective LEDs. In the known illumination system, side surfaces of the light-guide member are formed into curved surfaces and the light-guide member is provided at a side facing away from the LEDs with an exit surface from which the light emitted by the LEDs is emitted. At the exit surface of the light-guide member, the light-guide member is provided with a diffusion layer for diffusing the light exiting from the exit surface. The known illumination system is constructed such that when light emission failure occurs at any of the three LEDs, that LED can be replaced to restore the white light emitting function.

A drawback of the known illumination system is that the light emitted by the illumination system is not sufficiently uniform.

The invention has for its object to eliminate the above disadvantage wholly or partly. According to the invention, this object is achieved by an illumination system comprising:
a plurality of light-collimating sections and a light-mixing section,
the light-collimating sections being arranged substantially parallel to each other along a longitudinal axis of the illumination system,
each of the light-collimating sections being associated with at least one light emitter,
each of the light emitters being in optical contact with the respective light-collimating section via a dielectric material with a refractive index larger than or equal to 1.3,
the light-collimating sections merging into the light-mixing section at a side facing away from the light emitters,
the light-collimating sections and the light-mixing section forming one integral part,
light propagation in the light-mixing section being based on total internal reflection, and
the light-mixing section having a plurality of faces parallel to the longitudinal axis.

According to the invention, an illumination system is provided with integrated optics. The optics of the illumination system comprises a single dielectric part integrating two functions: collimation of light emitted by the light emitters as well as spatial and/or angular mixing of the light emitted by the light emitters. A number of light-collimating sections are arranged substantially parallel to each other along a longitudinal axis of the illumination system. Each of the light-collimating sections is associated with a single light emitter or with a cluster of light emitters. By providing optical contact between the light emitters and the respective light-collimating section reflection losses are substantially reduced. The optical contact between the light emitters and the respective light-collimating section is obtained by providing a dielectric material with a refractive index larger than or equal to 1.3 between the light emitters and the light-collimating section or as part of the light-collimating section, and that is in direct contact with the light emitters. Preferably, the light-collimating sections are made of a non-gaseous, optically transparent dielectric material.

At a side facing away from the light emitters, the light-collimating sections merge into the light-mixing section for forming an integral part with the light-collimating sections. By avoiding interface surfaces between the light-collimating sections and the light-mixing section, the efficiency of light propagation in the illumination system according to the invention is enhanced. By forming the light-collimating sections and the light-mixing section into one single dielectric portion, so-called Fresnel reflection losses at interfaces are avoided.

By basing the propagation of light emitted by the light emitters on total internal reflection (TIR), light losses in the light-mixing section are largely avoided. In addition, by providing the light-mixing section with a plurality of (substantially flat) faces arranged parallel to the longitudinal axis, spatial mixing of the light emitted by the light emitters is stimulated. If the light-mixing section is provided with a substantially circular outer surface this is unfavorable for spatial mixing of the light emitted by the light emitters.

Preferably, the light-mixing section is provided with four or six faces. It was found that such a number of faces provide excellent spatial and spatio-angular mixing of the light emitted by the light emitters.

The distribution of light emitted by the illumination system according to the invention is substantially uniform. Depending on the dimensions of the illumination system, the light emitted by the illumination system is substantially mixed in a spatial and angular manner. In addition, the light emitted by the illumination system is substantially collimated (paralleled).

The uniformity of the light emitted by the illumination system is further improved by dimensioning the light-mixing section in a favorable manner. To this end a preferred embodiment of the illumination system according to the invention is characterized in that the ratio of a length $l_{ms}$ of the light-mixing section parallel to the longitudinal axis and a diameter $d_{ms}$ of the light-mixing section is in the range:

$$3.5 \leq \frac{l_{ms}}{d_{ms}} \leq 10.$$

Values of $l_{ms}/d_{ms}$ larger than 10 are feasible, but the dimensions of the light-mixing section would become impractical. Values of $l_{ms}/d_{ms}$ smaller than 3.5 are also feasible, but the spatial and/or angular mixing of the light emitted by the illumination system are relatively limited at such low values.

A preferred embodiment of the illumination system according to the invention is characterized in that a part of an outer surface of the light-collimating sections is reflective or provided with a reflective layer. By providing a reflective layer the light emitted by the light emitters is propagated in the direction of the light-mixing section of the illumination system.

According to an alternative preferred embodiment of the illumination system light propagation in the light-collimating sections is based on total internal reflection. By basing propagation of light emitted by the light emitters in the light-collimating sections on total internal reflection, light losses in the light-mixing section are largely avoided. In this embodiment, light propagation according to total internal reflection is provided in the entire integral dielectric body of the light-mixing section and the light-collimating sections forming the illumination system.

The collimation of the light emitted by the illumination system can be further improved by providing additional means for collimating the light emitted by the light emitters. To this end a preferred embodiment of the illumination system according to the invention is characterized in that the light-mixing section at a side facing away from the light emitters is provided with a further light-collimating section. This further light-collimating section further collimates the beam of light emitted by the light-mixing section.

There are various ways to realize the further light-collimating section. In a first embodiment, the further light-collimating section comprises a conical shape broadening from the light-mixing section. In a further embodiment, the further light-collimating section is facetted for further enhancing the homogenization of the light beam emitted by the illumination system. In yet a further embodiment, the further light-collimating section is substantially shaped according to a compound parabolic concentrator (CPC). Combinations of the embodiments of the further light-collimating sections are possible.

A preferred embodiment of the illumination system according to the invention is characterized in that the illumination system comprises a light-shaping diffuser, in particular, a holographic diffuser. Preferably, the holographic diffuser is a randomized holographic diffuser. The primary effect of the holographic diffuser is that a uniform spatial and angular color and light distribution is obtained. By the nature of the holographic diffuser, the dimensions of the holographic diffuser, or beam shaper, are so small that no details are projected on a target, thus resulting in a spatially and/or angularly smoothly varying, homogeneous beam pattern. A secondary effect of a holographic diffuser is the causing of a change in the shape of the light beam emitted by the illumination system. Preferably, the diffuser is integrated with the dielectric body of the light-mixing section and located at the exit window of the light-mixing section.

These and other aspects of the invention are apparent from and will be elucidated with reference to the embodiments described hereinafter.

In the drawings.

The Figures are purely diagrammatic and not drawn to scale. Notably, some dimensions are shown in a strongly exaggerated form for the sake of clarity. Similar components in the Figures are denoted as much as possible by the same reference numerals.

Figure 1A:
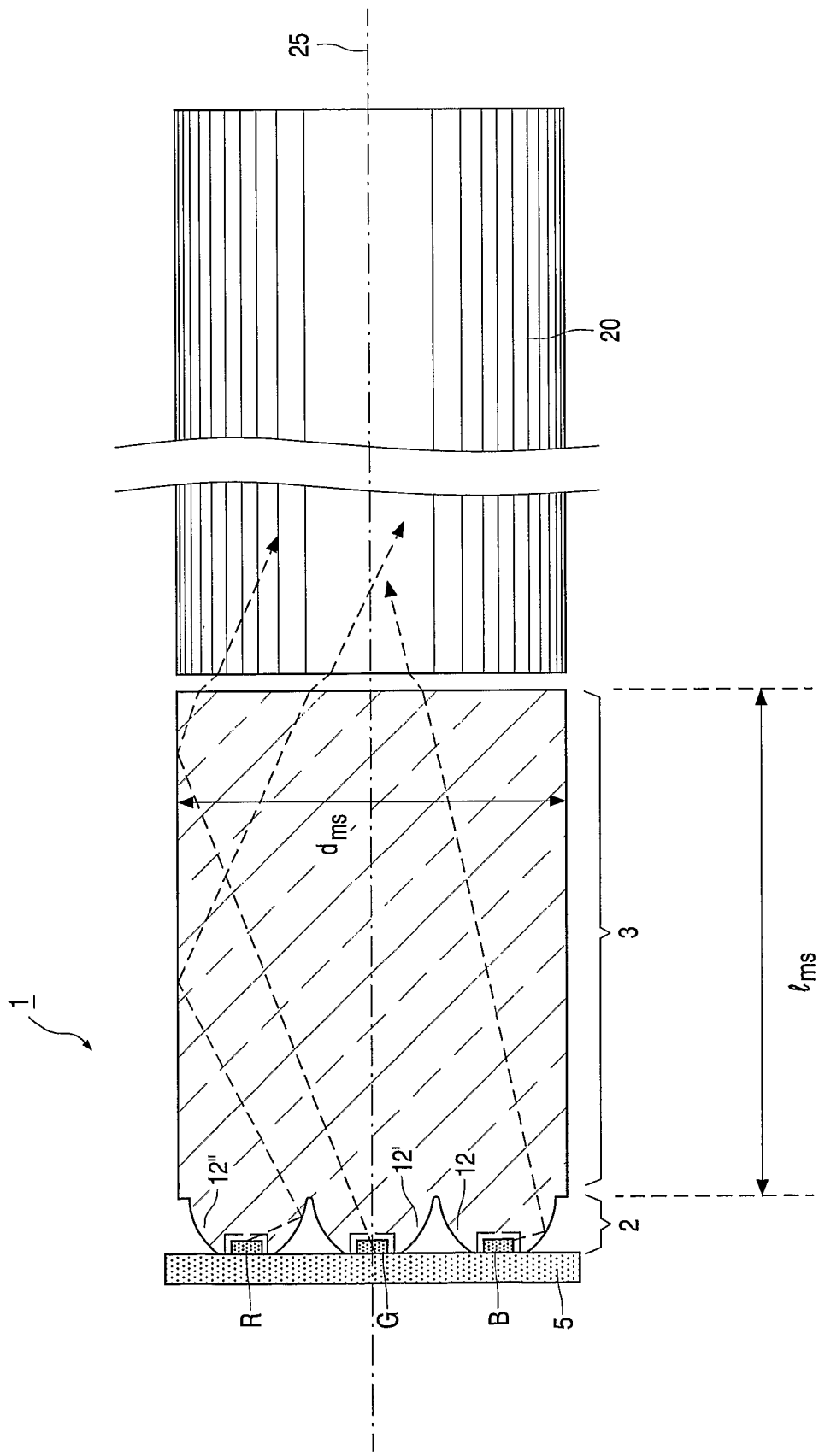
FIG. 1A is a cross-sectional view of a first embodiment of the illumination system according to the invention.

FIG. 1A very schematically shows a cross-sectional view of a first embodiment of the illumination system according to the invention. The illumination system comprises a plurality of light emitters for instance a plurality of light-emitting diodes (LEDs). LEDs can be light emitters of distinct primary colors, such as in the example of FIG. 1A, the well-known red R, green G, or blue B light emitters. Alternatively, the light emitter can have, for example, amber, magenta or cyan as primary color. The primary colors may be either generated directly by the light-emitting-diode chip, or may be generated by a phosphor upon irradiance with light from the light-emitting-diode chip. In the latter case, also mixed colors or white light is possible as one of the primary colors. In the example of FIG. 1A, the LEDs R, G, B are mounted on a (metal-core) printed circuit board 5. In general, LEDs have relatively high source brightness. Preferably, each of the LEDs has a radiant power output of at least 100 mW when driven at nominal power. LEDs having such a high output are also referred to as LED power packages. The use of such high-efficiency, high-output LEDs has the specific advantage that, at a desired, comparatively high light output, the number of LEDs may be comparatively small. This has a positive effect on the compactness and the efficiency of the illumination system to be manufactured. If LED power packages are mounted on such a (metal-core) printed circuit board 5, the heat generated by the LEDs can be readily dissipated by heat conduction via the PCB. In a favorable embodiment of the illumination system, the (metal-core) printed circuit board 5 is in contact with a housing (not shown in FIG. 1A) of the illumination system via a heat-conducting connection. Preferably, so-called naked-power LED chips are mounted on a substrate, such as for instance an insulated metal substrate, a silicon substrate, a ceramic or a composite substrate. The substrate provides electrical connection to the chip and acts as well as a good heat transportation section to transfer heat to a heat exchanger.

The embodiment of the illumination system as shown in FIG. 1A comprises a plurality 2 of light-collimating sections 12, 12', 12" and a light-mixing section 3. The light-collimating sections 12, 12', 12" are arranged substantially parallel to each other along a longitudinal axis 25 of the illumination system. More precisely, the sections each have an axis of rotation symmetry, which axes are arranged substantially parallel to each other and to longitudinal axis 25. Each of the light-collimating sections 12, 12', 12" is associated with at least one light emitter R, G, B. In the example of FIG. 1A a single LED is associated with each respective light-collimating section. In an alternative embodiment there are more LEDs associated with each respective light-collimating section. This may be either a number of the LEDs with the same primary color or a number of LEDs with two or more primary colors.

According to the invention, each of the light emitters R, G, B is in optical contact with the respective light-collimating section 12, 12', 12" via a dielectric material with a refractive index larger than or equal to 1.3. Preferably, the light-collimating sections 12, 12', 12" are made of a non-gaseous, optically transparent dielectric material.

According to the invention, the plurality 2 of the light-collimating sections 12, 12', 12" and the light-mixing section 3 form a single integral part 1. To this end the light-collimating sections 12, 12', 12" merge into the light-mixing section 3 at a side facing away from the light emitters R, G, B. By avoiding interface surfaces between the light-collimating sections 12, 12', 12" and the light-mixing section 3, the efficiency of light propagation in the illumination system according to the invention is largely enhanced. By forming the light-collimating sections 12, 12', 12" and the light-mixing section 3 into one single dielectric piece of material, so-called Fresnel reflection losses at interfaces are avoided.

According to the invention, light propagation in the light-mixing section 3 of the illumination system is based on total internal reflection whereby light losses in the light-mixing section 3 are largely avoided. A few examples of light rays emitted by the light emitters R, G, B are shown in FIG. 1A.

In addition, the light-mixing section 3 comprises a plurality of faces parallel to the longitudinal axis 25, thereby stimulating spatial mixing of the light emitted by the light emitters R, G, B. If the light-mixing section is provided with a substantially circular outer surface, spatial mixing of the light emitted by the light emitters would not be stimulated enough. Preferably, the light-mixing section 3 is provided with four or six faces. Such a number of faces provide excellent spatial and spatio-angular mixing of the light emitted by the light emitters.

By constructing the LED-based light generator with integrated optics, the optics consisting of a single dielectric part, two functions of the illumination system are integrated: collimation of the light as well as spatial and/or angular mixing of the light emitted by the plurality of LED chips. Preferably, the light-collimating sections 2 and the light-mixing section 3 are made from an acrylic material or from glass. The light-collimating section is preferably moulded directly on and around the light emitters, or an encapsulant is provided between the light emitters and the light-collimating section. The illumination system according to the invention has an improved system efficiency due to a practically loss-less total internal reflection in the light-collimating section and the light-mixing section. In addition, due to the light-collimating section and the light-mixing section being formed as one single dielectric body, interfaces are reduced that would lead to unwanted loss of efficiency of the illumination system. By reducing the number of optical parts and because the complete optics are made as a single injection moulded component, the illumination system according to the invention is cost-effective.

In the example of FIG. 1A, the illumination system is coupled to a light guide 20, which may be an optical fiber or some other light guide, and which may be provided with other beam-shaping optics. The light guide may have features to extract the light in a pre-determined manner, e.g. by emitting the light homogeneously from a side of the light guide member. In an alternative embodiment the light emitted by the illumination system according to the invention is used to light a backlight illumination system, e.g. for use in (image) display devices, for example in television receivers and monitors. Another application area of the illumination system according to the invention is the use as illumination source in a digital projector or so-called beamer for projecting images or displaying a television program, a film, a video program or a DVD, or the like. Yet another application area of the illumination system according to the present invention is the use as illumination source in direct view luminance applications such as signage, light tiles, contour lighting and the like. In another application area of the illumination system according to the invention the illumination system is used to couple light into a light guide such as end-emitting or side emitting fibers or fiber bundles.

Part of an outer surface of the light-collimating sections 12, 12', 12" may be made reflective or may be provided with a reflective layer (not shown in FIG. 1A) that is in direct contact with the dielectric of the light-collimating sections or that is provided as a separate component not in direct contact with the light-collimating sections such that part of the light is reflected by total internal reflection and the other, transmitted, part is reflected by the external reflector. However, light propagation in the light-collimating sections 12, 12', 12" is promoted by basing light propagation in the light-collimating sections 12, 12', 12" on total internal reflection (TIR). This avoids any losses due to reflections and is the favorable mechanism for reflecting the light during propagation through the light collimating and light-mixing sections. However, providing part of each of the light-collimating sections with a reflective layer enables smaller pitches between the light-collimating sections, i.e., a more dense packing of the light sources, an thus reduces the overall size of the system significantly. In such an embodiment, preferably the light-collimating sections at least partly are designed as a so-called compound parabolic concentrator (CPC). Preferably, the collimation of the light in the light-collimating sections is limited to that angles of propagation relative to the optical axis such that these light rays just stay within the regime of total internal reflection when interacting with the side walls of the light-mixing section. In this manner the length of the light-mixing section required for a certain degree of homogenization is minimized, enabling minimum overall system dimensions. In an alternative embodiment, the shape of the light-collimating section is similar to but not exactly the shape of a compound parabolic concentrator.

Mixing of light in the light-mixing section 3 is promoted if the dimensions of the light-mixing section are suitable chosen. Preferably, the ratio of a length $l_{ms}$ of the light-mixing section 3 measured parallel to the longitudinal axis 25 and a characteristic Dimension of the thickness of the light-mixing section 3, addressed as the diameter $d_{ms}$ of the light-mixing section 3 is in the range $$3.5 \le \frac{l_{ms}}{d_{ms}} \le 10.$$

A very suitable value for the ratio $l_{ms}/d_{ms}$ is approximately 5.

Figure 1B:
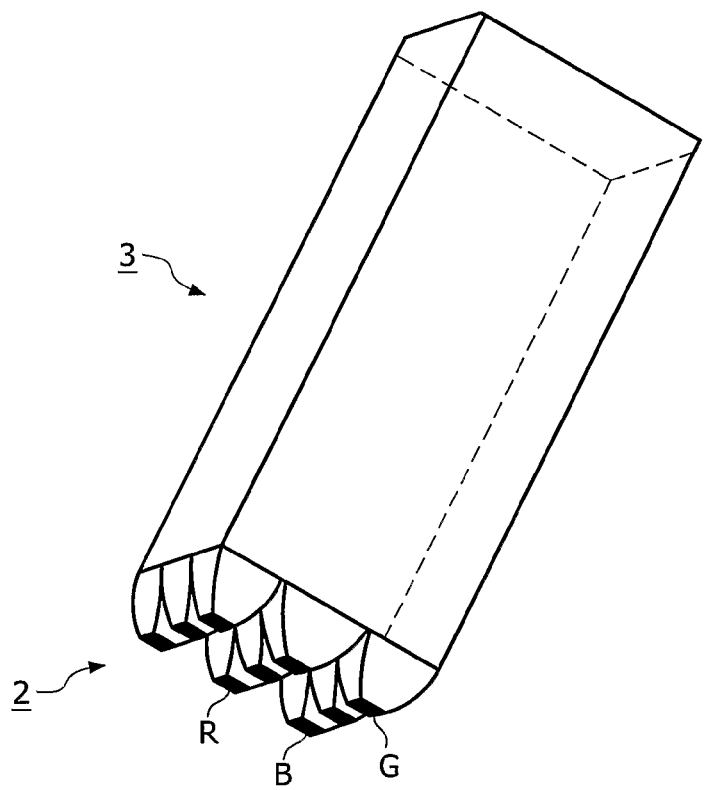
FIGS. 1B and 1C are perspective views of two alternative embodiments of the light-collimating section and the light-mixing section of the illumination system as shown in FIG. 1A.
Figure 1C:
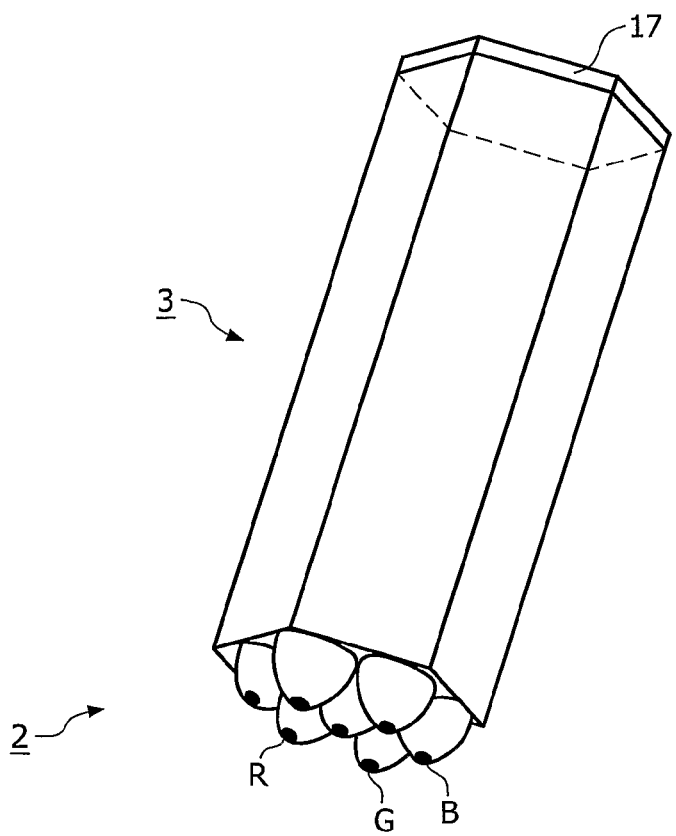

FIG. 1B and FIG. 1C are perspective views of two alternative embodiments of the light-collimating section and the light-mixing section of the illumination system as shown in FIG. 1A. FIG. 1B shows an embodiment of the light-collimating section 2 and the light-mixing section 3 wherein the light-mixing section 3 comprises four faces. FIG. 1C shows an embodiment of the light-collimating section 2 and the light-mixing section 3 wherein the light-mixing section 3 comprises six faces. In both embodiments, all faces are positioned parallel with respect to the longitudinal axis 25. In both FIGS. 1B and 1C, the light-mixing section 3 wherein the light-mixing section 3 are made from a single piece of material. The light-emitters R, G, B are indicated very schematically in FIGS. 1B and 1C.

Figure 2:
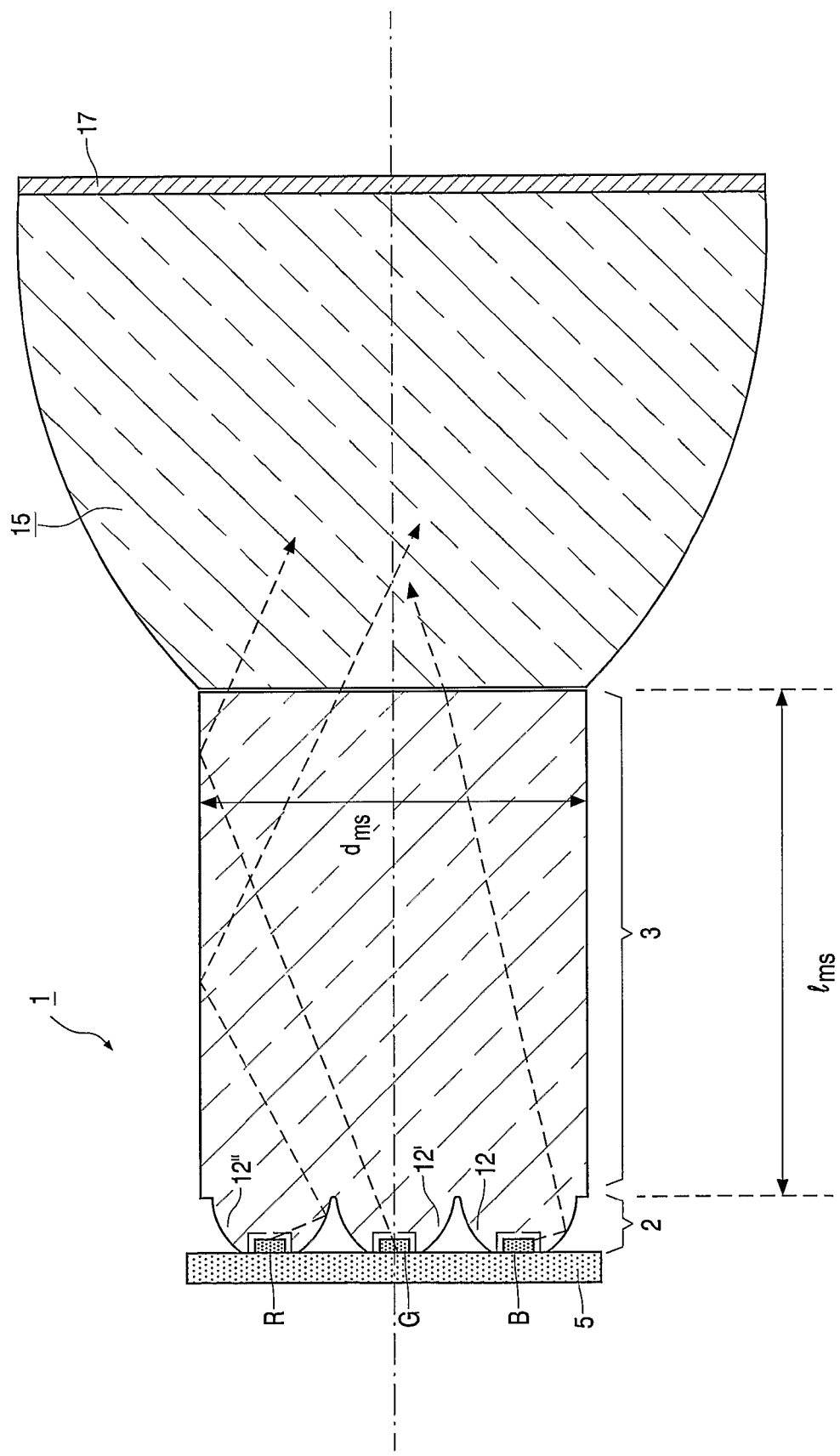
FIG. 2 is a cross-sectional view of a second embodiment of the illumination system according to the invention.

FIG. 2 very schematically shows a cross-sectional view of a second embodiment of the illumination system according to the invention. In the embodiment of FIG. 2, the light-mixing section 3 at a side facing away from the light emitters R, G, B is provided with a further light-collimating section 15 for collimating the light emitted by the light emitters. By providing the further light-collimating section 15, the collimation of the light emitted by the illumination system is further improved. In addition, the further light-collimating section 15 effectively further collimates the beam of light emitted by the illumination system to the desired numerical aperture of an additional optical system. In the example of FIG. 2, the further light-collimating section 15 comprises a conical shape broadening from the light-mixing section 3. In addition or alternatively, the further light-collimating section 15 is facetted, as illustrated in embodiments of FIGS. 1B and 1C, and/or the further light-collimating section 15 is substantially shaped according to a compound parabolic concentrator.

Normally LEDs radiate according to a complete hemisphere or more. Using lenses to collimate the light from such relatively small light emitters implies that only a relatively small part of the light generated is effectively used. An almost perfectly efficient collimator is the so-called Compound Parabolic Concentrator (CPC) or significantly similar collimator. Because the LED surface does, generally, not uniformly radiate, and because different colored LEDs may be used, an extra homogenization step is necessary. An integration rod on top the light-collimating section is one of the options to achieve this. The CPC and the integrating rod can be combined into one (plastic) component. It is advantageous to use two CPCs as compared to one CPC. In such a configuration, an additional light-collimating section can be situated between both CPCs. Because the beam is collimated just sufficiently for efficient homogenization in a small integration-rod section, the device becomes significantly smaller. Preferably, the second CPC collimates the beam to the desired numerical aperture of a subsequent optical system.

In the example of FIG. 2, the illumination system comprises a holographic diffuser 17. Preferably, the holographic diffuser is a randomized holographic diffuser. The primary effect of the holographic diffuser is that a substantially uniform spatial and angular color and light distribution is obtained.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. An illumination system comprising:
a plurality of first light-collimating sections and a light-mixing section, the first light-collimating sections being arranged substantially parallel to each other along a longitudinal axis of the illumination system,
each of the first light-collimating sections being associated with at least one light emitter,
each of the light emitters being in optical contact with the respective light-collimating section via a dielectric material with a refractive index larger than or equal to 1.3,
the first light-collimating sections merging into the light-mixing section at a side facing away from the light emitters,
the first light-collimating sections and the light-mixing section forming one integral part,
light propagation in the light-mixing section being based on total internal reflection, and
the light mixing section having a plurality of faces parallel to the longitudinal axis, wherein the light-mixing section at the side facing away from the light emitters comprises a second light-collimating section.

2. The illumination system as claimed in claim 1, wherein the ratio of a length $l_{ms}$ of the light-mixing section parallel to the longitudinal axis and a diameter $d_{ms}$ of the light-mixing section is in the range:

$$3.5 \le \frac{l_{ms}}{d_{ms}} \le 10.$$

3. The illumination system as claimed in claim 1, wherein a part of an outer surface of at least the first light-collimating sections is reflective or provided with a reflective layer.

4. The illumination system as claimed in claim 3, wherein the reflective surface of the first light-collimating sections is shaped substantially according to a compound parabolic concentrator.

5. The illumination system as claimed in claim 1, wherein light propagation in at least the first light-collimating sections is based on total internal reflection.

6. The illumination system as claimed in claim 1, wherein the light-mixing section is provided with four or six faces.

7. The illumination system as claimed in claim 1, wherein the second light-collimating section comprises a conical shape broadening from the light-mixing section.

8. The illumination system as claimed in claim 1, wherein the second light-collimating section is facetted.

9. The illumination system as claimed in claim 1, wherein the second light-collimating section is substantially shaped according to a compound parabolic concentrator.

10. The illumination system as claimed in claim 1, wherein the illumination system comprises a holographic diffuser, the holographic diffuser being provided at an exit window of the illumination system or at an exit window of the light-mixing section of the illumination system.

11. The illumination system as claimed in claim 1, wherein the light emitters comprise at least a first light-emitting diode of a first primary color, at least a second light-emitting diode of a second primary color, and at least a third light-emitting diode of a third primary color, the three primary colors being distinct from each other.

12. The illumination system as claimed in claim 11, wherein each of the light-emitting diodes has a radiant power output of at least 100 mW when driven at nominal power.

* * * * *